(12) United States Patent
Pantuso et al.

(10) Patent No.: US 7,237,258 B1
(45) Date of Patent: Jun. 26, 2007

(54) SYSTEM, METHOD AND COMPUTER PROGRAM PRODUCT FOR A FIREWALL SUMMARY INTERFACE

(75) Inventors: Joseph J. Pantuso, Springboro, OH (US); Christopher D. Ritter, West Carrollton, OH (US)

(73) Assignee: McAfee, Inc., Santa Clara, CA (US)

( * ) Notice: Subject to any disclaimer, the term of this patent is extended or adjusted under 35 U.S.C. 154(b) by 868 days.

(21) Appl. No.: 10/071,586

(22) Filed: Feb. 8, 2002

(51) Int. Cl.
*G06F 21/00* (2006.01)

(52) U.S. Cl. .................. 726/11; 726/12; 713/151; 713/153; 713/154; 713/164; 705/79; 715/710; 715/736; 715/747; 380/258

(58) Field of Classification Search ............. 713/202, 713/151, 154, 200, 164; 380/258; 726/11, 726/12; 705/79; 715/710, 747
See application file for complete search history.

(56) References Cited

U.S. PATENT DOCUMENTS

| | | |
|---|---|---|
| 5,632,011 A | 5/1997 | Landfield et al. ............ 395/326 |
| 5,864,666 A | 1/1999 | Shrader .................. 395/187.01 |
| 5,867,494 A * | 2/1999 | Krishnaswamy et al. ... 370/352 |
| 5,928,333 A | 7/1999 | Landfield et al. ............ 709/245 |
| 6,009,475 A | 12/1999 | Shrader ....................... 709/249 |
| 6,169,992 B1 | 1/2001 | Beall et al. .................. 707/103 |
| 6,212,633 B1 | 4/2001 | Levy et al. .................. 713/153 |
| 6,308,276 B1 | 10/2001 | Ashdown et al. ............ 713/201 |
| 6,567,808 B1 * | 5/2003 | Eschelbeck et al. .......... 707/10 |
| 2002/0024070 A1 * | 2/2002 | Fournel ....................... 257/262 |
| 2002/0049883 A1 | 4/2002 | Schneider et al. .......... 711/100 |
| 2002/0054587 A1 | 5/2002 | Baker et al. ................. 370/352 |
| 2002/0066034 A1 * | 5/2002 | Schlossberg et al. ....... 713/201 |
| 2002/0087447 A1 | 7/2002 | McDonald et al. .......... 705/36 |
| 2002/0174340 A1 * | 11/2002 | Dick et al. .................. 713/178 |

FOREIGN PATENT DOCUMENTS

| | | |
|---|---|---|
| EP | 1119151 A2 | 7/2001 |
| WO | 00/60809 | 10/2000 |
| WO | 02/069175 | 9/2002 |

OTHER PUBLICATIONS

Zone Labs: Zone Alarm Help, Introduction, Quick Tour, Jun. 2001.*
S. Boran, "Personal Firewalls / Intrusion Detection Systems, An Analysis of Mini-Firewalls for Windows Users, PGP Desktop Security 7, Features" Nov. 1999.*
Smart Computing, Reviews: "Hack Tracer 1.2" Smart Computing, vol. 12, Issue 1, Jan. 2001.*
www.hackerwatch.org, Anti-Hacker Online Community, May 2002.

* cited by examiner

*Primary Examiner*—Emmanuel L. Mosie
*Assistant Examiner*—Paul Callahan
(74) *Attorney, Agent, or Firm*—Zilka-Kotab, PC; Christopher J. Hamaty

(57) ABSTRACT

A system, method and computer program product are provided for summarizing firewall activity. Initially, a plurality of types of events associated with a firewall of a local computer is organized. Further, a number of occurrences of each type of event is tracked utilizing the firewall. Further, a graphical representation is displayed indicating a severity of the number of the events utilizing the firewall.

16 Claims, 10 Drawing Sheets

SYSTEM, METHOD AND COMPUTER PROGRAM PRODUCT FOR A FIREWALL SUMMARY INTERFACE

FIELD OF THE INVENTION

The present invention relates to firewalls, and more particularly to graphical user interfaces associated with firewalls.

BACKGROUND OF THE INVENTION

In the space of just a few years, the Internet—because it provides access to information, and the ability to publish information, in revolutionary ways—has emerged from relative obscurity to international prominence. Whereas in general an internet is a network of networks, the Internet is a global collection of interconnected local, mid-level, and wide-area networks that use the Internet Procotol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

Firewalls are intended to shield data and resources from the potential ravages of computer network intruders. In essence, a firewall functions as a mechanism which monitors and controls the flow of data between two networks, or a network and a device. All communications, e.g., data packets, which flow between the networks in either direction must pass through the firewall; otherwise, security is circumvented. The firewall selectively permits the communications to pass from one network to another network or device, to provide bidirectional security.

Recently, there has been much work on software applications referred to as "personal firewalls." These applications are typically installed on a computer or any other computing device for protecting against unsecure networks coupled thereto. During use of such personal firewalls, network traffic is monitored and filtered based on a predetermined set of rules. Such rules may include any filtering criteria that are configured to protect the device from intrusion activity. For example, such criteria may result in: the prevention of computers having certain IP addresses from accessing the protected device, precluding access to certain ports associated with the protected device, the prevention of certain applications from accessing the protected device, etc. During use, a vast number of events may occur where network traffic is prevented based on the filtering criteria.

Often, a user may desire to modify the filtering criteria to tailor security for a particular device. Further, the user may wish to monitor the events to assess the current state of security of the device for the purposes of modifying the filtering criteria in the foregoing manner. With the state of security being extremely dynamic, there is a need to assess security and configure the personal firewall in a manner that is quick and effective. Unfortunately, prior art graphical user interfaces that allow a user to carry out such tasks are not integrated, and are cumbersome to use. For example, prior art personal firewalls merely list events, requiring the user to manually filter and analyze the data for the purpose of making a conclusion as to the current state of security of the device.

There is thus a need for an interface system and method capable of facilitating the assessment of a current state of security of a device and the configuration process associated with a personal firewall used to protect such device.

DISCLOSURE OF THE INVENTION

A system, method and computer program product are provided for summarizing firewall activity. Initially, a plurality of types of events associated with a firewall of a local computer is organized. Further, a number of occurrences of each type of event is tracked utilizing the firewall. Further, a graphical representation is displayed indicating a severity of the number of the events utilizing the firewall.

In one embodiment, the events may include blocked attempts of various types. One of the type of the blocked attempts may include blocked attempts of remote computers to access predetermined banned ports associated with the local computer. Further, one of the types of the blocked attempts may include blocked attempts of remote computers with a predetermined set of Internet Protocol (IP) addresses to access the local computer. Still yet, one of the types of the blocked attempts may include blocked attempts to access a network made by predetermined applications. As an option, the various types of the blocked attempts may be organized into categories.

In another embodiment, additional information may be displayed. For example, a plurality of banned ports associated with the first type of the blocked attempts may be displayed with the number of the occurrences associated therewith. Further, a plurality of banned IP addresses associated with the second type of the blocked attempts may be displayed with the number of the occurrences associated therewith. Still yet, a plurality of banned applications associated with the third type of the blocked attempts may be displayed with the number of the occurrences associated therewith.

In still another embodiment, the number of occurrences of each type of event that occur within a predetermined time period may be displayed. Moreover, additional information to the events may be displayed upon the selection of the event, in a drill down manner.

For management purposes, a menu may also be displayed for selecting from a summary page, an application page, an event log, and an IP address page. Upon the selection of the applications page on the menu, an applications interfere may be displayed for selecting the predetermined applications. Upon the selection of an IP address page on the menu, an IP address interface may be displayed for selecting the predetermined IP addresses associated with the remote computers to be blocked. Still yet, upon the selection of an event log on the menu, a log of the events may be displayed.

For providing a quick reference as to the severity of the tally of each of the events, the graphical representation may include a bar graph. For example, a number of dots of other types of character may be used with is proportional to the severity of the total number of events. Optionally, a graphical representation may be displayed for each type of event.

A system, method and computer program product are provided for managing a firewall and reporting firewall activity associated therewith. Displayed in a first portion of an event log is a plurality of events. Upon the selection of one of the events, displayed in a second portion of the event log is information relating to the event. Further displayed is a menu in a third portion of the event log for selecting from a summary page for summarizing the events, an application selection page for selection of applications to be subject to security restrictions, and an Internet Protocol (IP) address selection page for selection of IP addresses to be subject to security restrictions.

DESCRIPTION OF THE PREFERRED EMBODIMENTS

Figure 1:
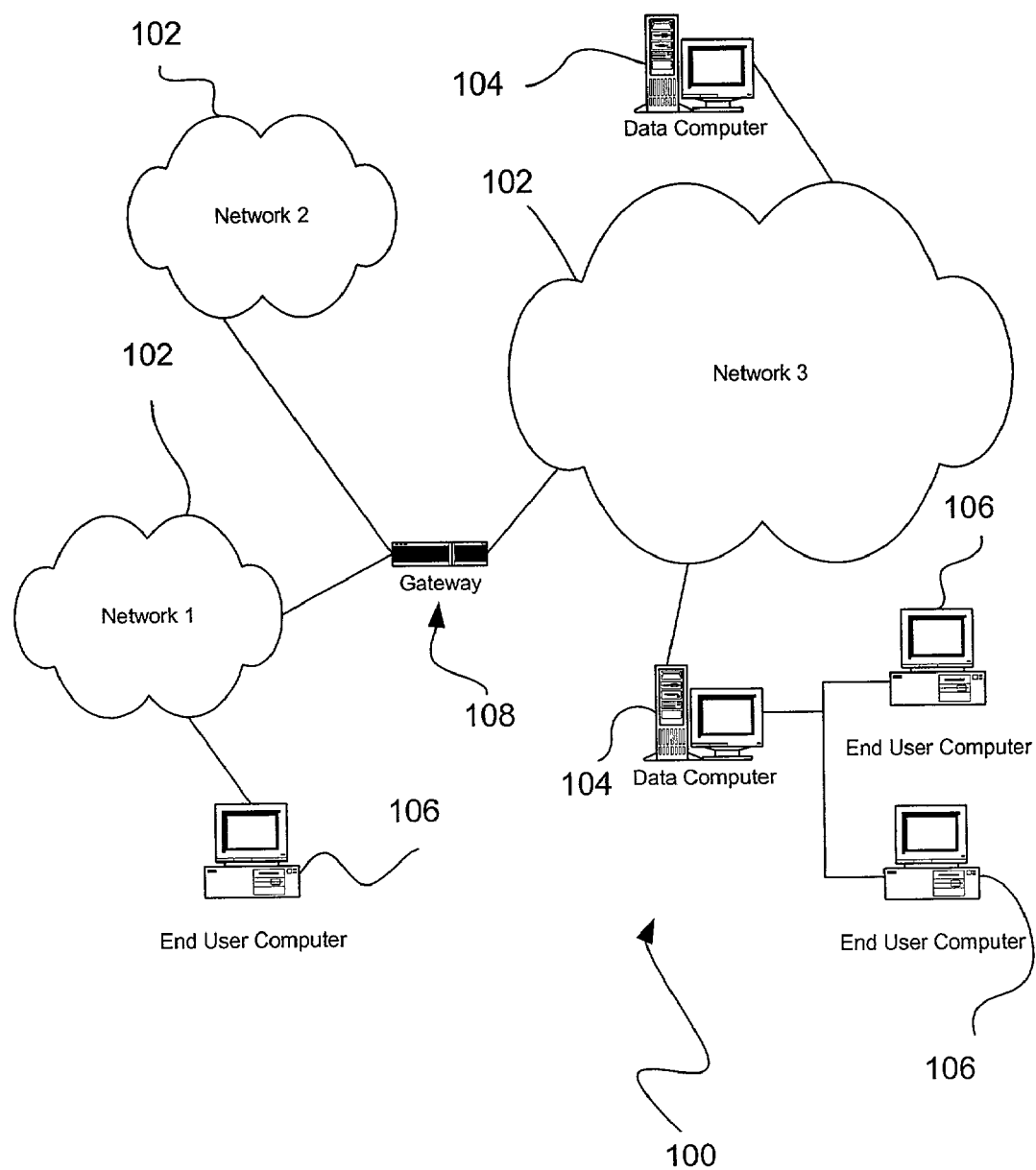
FIG. 1 illustrates an exemplary network environment, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data computers 104 which are capable of communicating over the networks 102. Also coupled to the networks 102 and the data computers 104 is a plurality of end user computers 106. In the context of the present description, such computers may include a web server, desktop computer, lap-top computer, hand-held computer, printer or any other type of hardware/software network device. More detail regarding an exemplary embodiment of such data computers 104 and user computers 106 will be set forth hereinafter during references to FIG. 2. A gateway 108 may optionally be coupled between the various computers.

One or more of the data computers 104 or user computers 106 may be equipped with a firewall. In one example, the firewalls may each include a software application installed directly on the data computers 104 or user computers 106 in the form of personal firewalls. Of course, other traditional approaches may also be employed. For example, a separate hardware component may be coupled between the computers and a network.

The firewalls installed on the data computers 104 or user computers 106 may be equipped with the ability of summarizing firewall activity. Initially, a plurality of types of events associated with the firewall of the computer is organized. Further, a number of occurrences of each type of event is tracked utilizing the firewall. Further, a graphical representation is displayed indicating a severity of the number of the events utilizing the firewall.

For managing the firewall and reporting firewall activity associated therewith, an enhanced firewall graphical user interface may also be provided. Displayed in a first portion of an event log is a plurality of events. Upon the selection of one of the events, displayed in a second portion of the event log is information relating to the event. Further displayed is a menu in a third portion of the event log for selecting from a summary page for summarizing the events, an application selection page for selection of applications to be subject to security restrictions, and an Internet Protocol (IP) address selection page for selection of IP addresses to be subject to security restrictions.

By this design, an enhanced firewall summary and control interface are provided for allowing a user to better gauge the status of filtering carried out by the firewall. Further, the interface disclosed allows the user to more effectively configure the firewall in response to the status provided by the firewall summary. More information regarding exemplary interfaces employing these features will be set forth hereinafter in greater detail.

Figure 2:
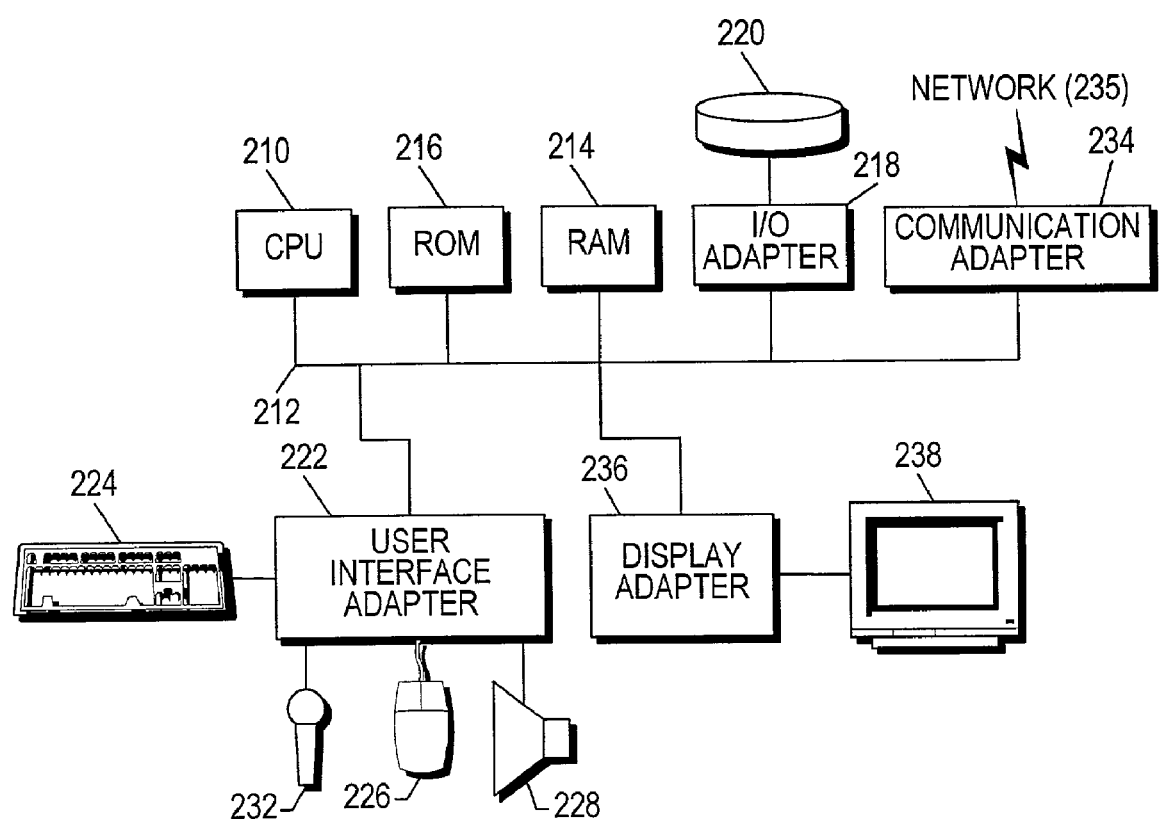
FIG. 2 shows a representative hardware environment associated with the computers of FIG. 1.

FIG. 2 shows a representative hardware environment that may be associated with the data computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, and I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
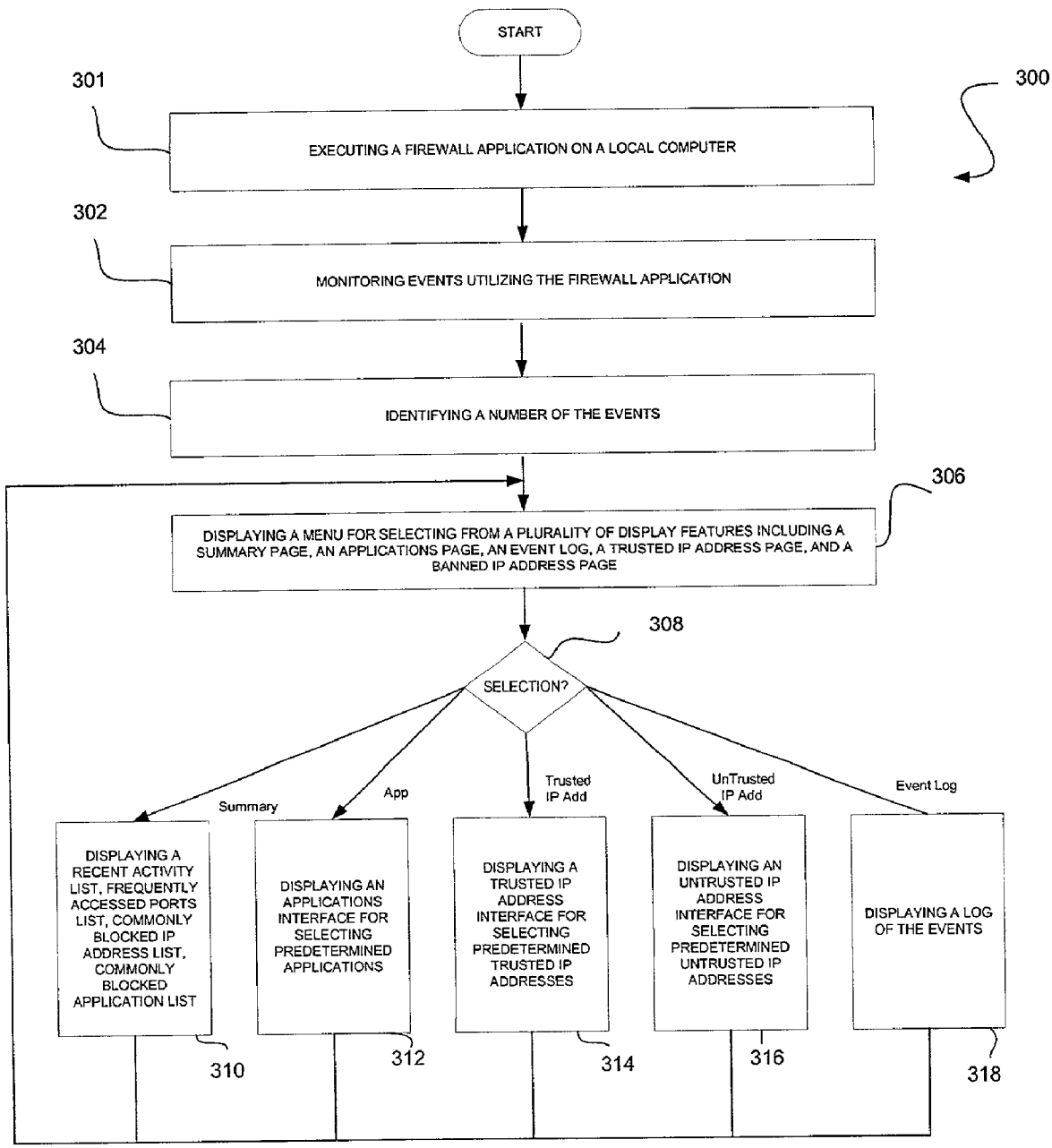
FIG. 3 is a flowchart of a method for summarizing firewall activity, in accordance with one embodiment.

FIG. 3 is a flowchart of a method 300 for summarizing firewall activity, in accordance with one embodiment. As an option, the present method 300 may be carried out in the network architecture 100 of FIG. 1. Of course, however, the present method 300 may be executed in any desired context and environment.

Initially, in operation 301, a firewall is executed in association with a local computer. As mentioned earlier, the firewall may include a software application installed directly on the computer in the form of a personal firewall. Or course, other traditional approaches may also be employed including the use of a separate hardware component coupled between the computer and a network.

Initially, in operation 302, a plurality of events is tracked utilizing the firewall. Next, a number of such events is tracked in operation 304. In the context of the present description, such traffic events may include successful and/or or blocked attempts to access (i.e. communicate with) the local computer, and/or attempts of the local computer to access (i.e. communicate with) a network.

In one embodiment, the blocked attempts may be of various types. One of the types of the blocked attempts may include blocked attempts of remote computers to access predetermined banned ports associated with the local computer. Further, one of the types of the blocked attempts may include blocked attempts to remote computers with a predetermined set of Internet Protocol (IP) addresses to access the local computer. Still yet, one of the types of the blocked attempts may include blocked attempts to access a network made by predetermined applications. As an option, the various types of the blocked attempts may be organized into categories.

In operation 306, a menu is displayed for selecting from a plurality of interface features including a summary page, an applications page, an event log, a trusted IP address page, and a banned IP address page. Such selection is determined by decision 310. As will soon become apparent, such options provide an enhanced firewall summary and control interface for allowing a user to better gauge the status of filtering carried out by the firewall. Further, such interface allows the user to more effectively configure the firewall in response to the status provided by the firewall summary.

Upon the selection of the summary page on the menu, a summary page is displayed including a recent activity list, frequently accessed port list, commonly blocked IP address list, and commonly blocked application list. See operation 310. It should be noted that the summary page may be displayed in response to an active selection made using the menu and/or automatically displayed with the menu at start-up. Further displayed as a component of the summary page is a graphical representation indicating a severity of a number of the events detected utilizing the firewall.

For providing a quick reference as to the severity of the tally of each of the events, the graphical representation may include a bar graph. For example, a number of dots or other type of character may be used which is proportional to the severity of the total number of events. Such proportionality may be determined in any desired manner (i.e. using predefined equations, look-up table, etc.). As an option, the graphical representation may be displayed for each type of event. Further information regarding an exemplary summary page and related graphical severity representation will be set forth hereinafter in greater detail during reference to FIG. 4.

Upon the selection of the applications page on the menu, an applications interface is displayed for selecting the predetermined applications. See operation 312. This selection may be used to configure the firewall filtering in a user-defined manner. As mentioned earlier, one of the types of the attempts blocked by the firewall may include blocked attempts to access a network made by predetermined applications. Such applications may include, but are not limited to network browser applications, e-mail applications, file transfer protocol (FTP) applications, etc.

Upon the selection of the trusted IP address page on the menu, a trusted IP address interface is displayed for allowing a user to select the predetermined trusted IP addresses associated with remote computers not to be blocked. See operation 314. In a similar manner, an untrusted IP address interface is displayed for selecting the predetermined untrusted IP addresses associated with remote computers to be blocked, upon the selection of the untrusted IP address page on the menu. Note operation 316. As mentioned earlier, one of the types of the blocked attempts may include blocked attempts of remote computers with a predetermined set of Internet Protocol (IP) addresses to access the local computer.

Upon the selection of the event log on the menu, a log of events is displayed in accordance with operation 318. More information relating to an exemplary event log will be set forth during reference to FIG. 5.

Figure 4:
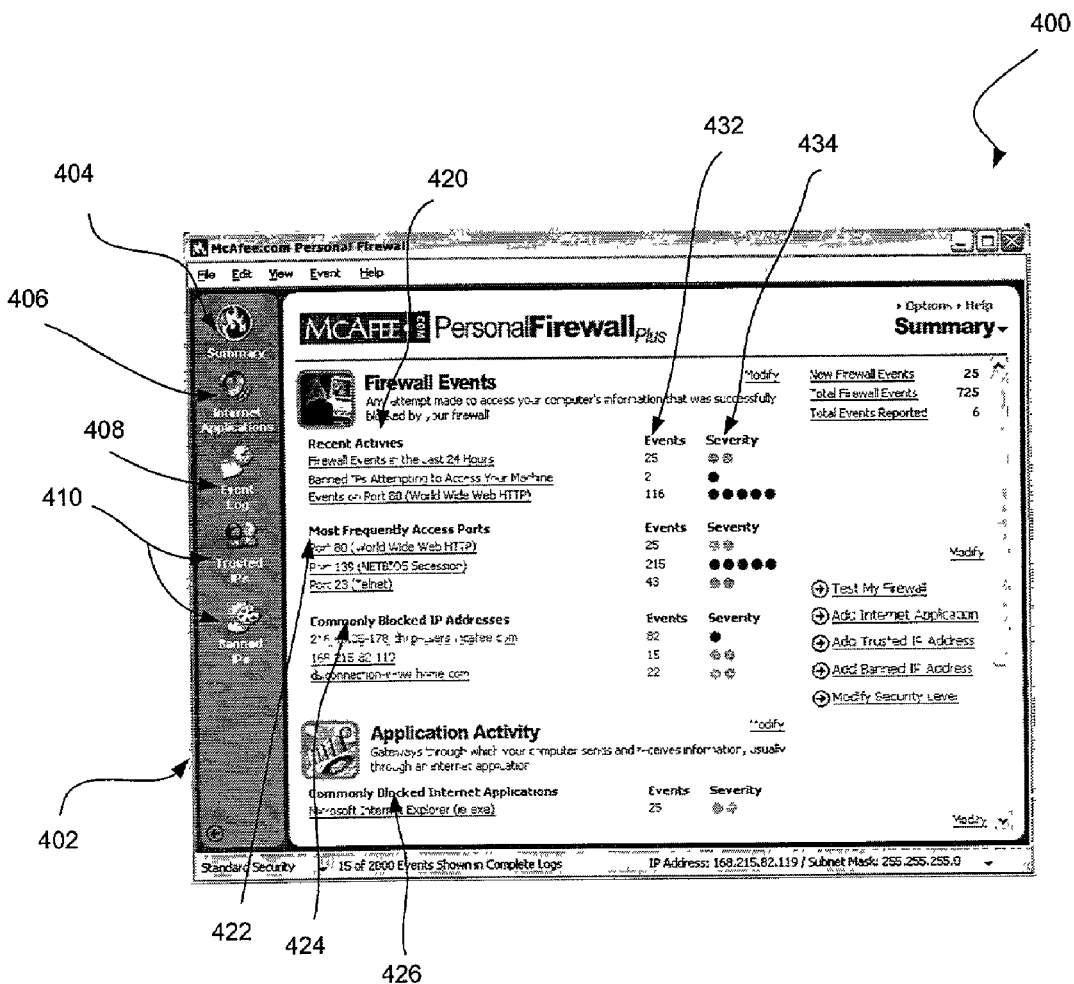
FIG. 4 illustrates an exemplary summary page, in accordance with operation 310 of FIG. 3.

FIG. 4 illustrates an exemplary summary page 400, in accordance with operation 310 of FIG. 3. It should be noted that the present interface is presented for illustrative purposes only, and any desired summary may be displayed to carry out the foregoing functionality.

As mentioned earlier, a menu 402 may also be displayed for selecting from a summary page icon 404 for displaying a summary in accordance with operation 310 of FIG. 3, an applications page icon 406 for selecting application in accordance with operation 312 of FIG. 3, an event log icon 408 for displaying a log of events in accordance with operation 318 of FIG. 3, and IP address page icons 410 for selecting trusted and untrusted IP address, in accordance with operations 314-316 of FIG. 3 Upon selection of the summary page icon 404 in the menu 402, the summary page 400 is simultaneously displayed in conjunction with the menu 402.

As shown, the summary page 400 is displayed including a recent activity list 420, frequently accessed port list 422, commonly blocked IP address list 424, and commonly blocked application list 426. As shown in FIG. 4, the recent activity list 420 includes recent activity icons corresponding to various events.

For example, one icon is reserved to indicate a total number of events within a predetermined time period, while another icon is reserved to represent the recent blocked attempts of the remote computers to access predetermined ports associated with the local computer. Further, additional icons are reserved for representing the recent blocked attempts of the remote computers with the predetermined set of banned IP addresses to access the local computer.

The recent activity list 420 further includes a total number 432 of the events within a predetermined time period corresponding with each recent activity icon, and a graphical representation 434 indicating a severity of the total number of the events.

As mentioned earlier, the graphical representation 434 may include a bar graph for providing a quick reference as to the severity of the tally of each of the events. For example, a number of dots or other type of character may be used which is proportional to the severity of the total number of events.

The frequently accessed port list 422 includes port icons corresponding to frequently accessed ports, and/or banned ports on which the blocked attempts of the remote computers occurred. The frequently accessed port list 422 further includes a total number of the attempts corresponding with each port icon, and a graphical representation indicating a severity of the total number of the attempts, similar to the previous list.

Still yet, the commonly blocked IP address list 424 includes IP address icons corresponding to banned IP addresses from which the blocked attempts of the remote computers occurred. The commonly blocked IP address list 424 further includes a total number of the blocked attempts corresponding with each IP address icon, and a graphical representation indicating a severity of the total number of the blocked attempts.

In a similar manner, the commonly blocked application list 426 includes application icons corresponding to banned applications associated with the blocked attempts. The commonly blocked application list 426 further includes a total number of the blocked attempts corresponding with each application icon, and a graphical representation indicating a severity of the total number of the blocked attempts.

Figure 5:
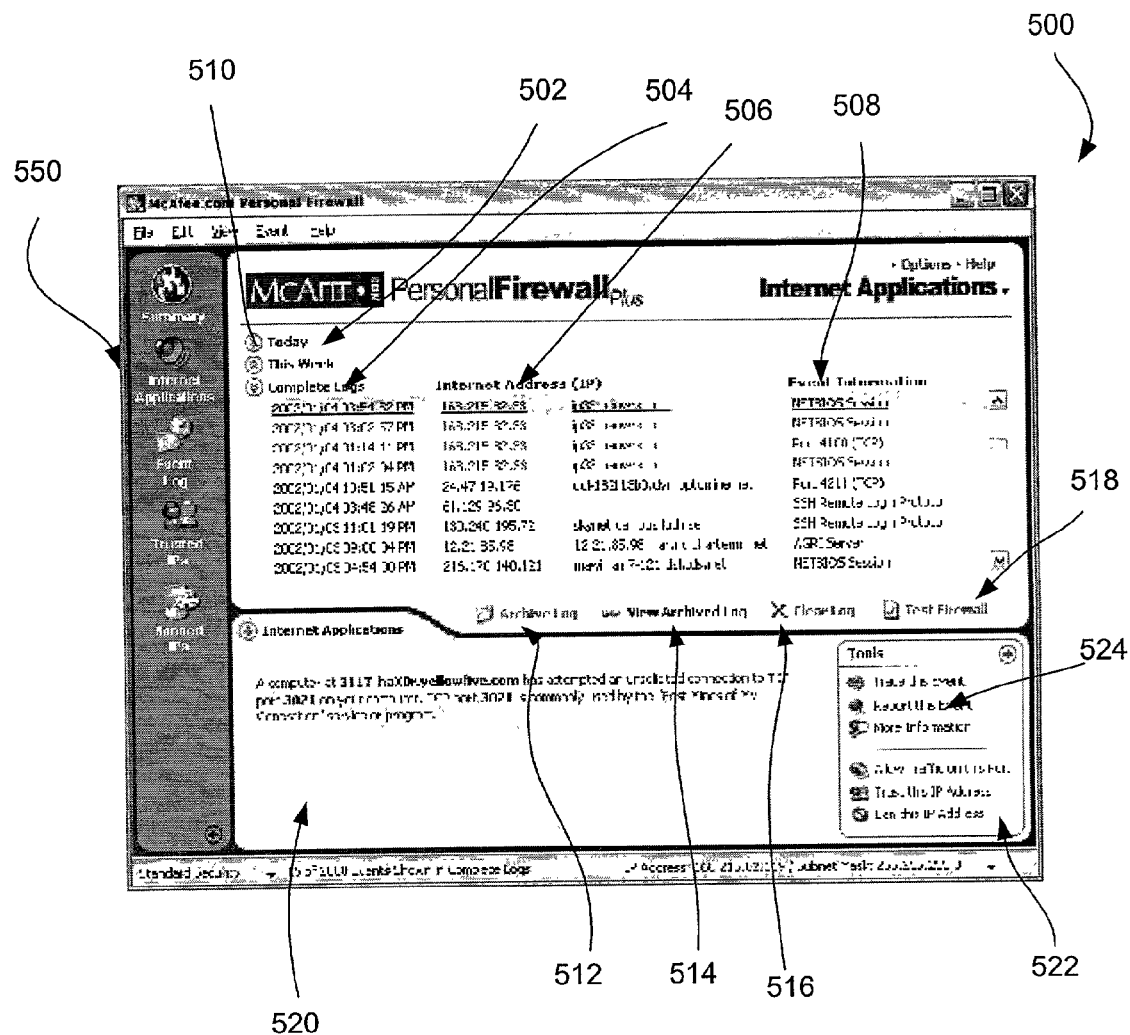
FIG. 5 illustrates an exemplary event log illustrating various traffic events that may be monitored by the firewall, in accordance with operation 318 of FIG. 3.

FIG. 5 illustrates an exemplary event log 500 illustrating various traffic events that may be monitored by the firewall, in accordance with operation 318 of FIG. 3. As shown, various categories 502 traffic events are shown. For example, a "Today" category, a "This Week" category, as well as a "Total" category may be provided. Further, various information may be displayed regarding each event, such as the time and date 504 when the traffic event was logged, the associated Internet Protocol (IP) address 506, and other related event information 508. During use, any of the listed events in the event log 500 may be selected.

Additional features may also be provided. For example, the various lists of traffic events under each category 502 may be collapsed and expanded as desired by selecting icons 510. By this feature, a user may focus on a category of interest. As a further option, the event log 500 may be archived upon the selection of an archive icon 512. Still yet, an archived event log 500 may be accessed via a view archived log icon 514. The present event log 500 may even be cleared using a clear event log icon 518.

Upon the selection of any of the traffic events in the event log 500, a lower portion 520 of the event log 500 may be reserved for additional information relating to the selected event. Such information may include, but is not limited to applications associated with the selected event.

As an option, the menu 550 may be simultaneously displayed in conjunction with the event log 500 for providing the user quick and efficient access to other optional features such as a summary page, a list of trusted and banned IP addresses, etc.

Still another portion 522 of the event log 500 may include a plurality of tools for processing a selected traffic event. For example, a report icon 524 may be selected in order to transmit intrusion activity information to a central server for analysis. Other features may include an option to record the selected event, identify additional information on the selected event, allow traffic on a port associated with the selected event, allow the receipt of traffic from an IP address associated with the selected event, and disallow the receipt of traffic from an IP address associated with the selected event. Of course, any desired functionality may be incorporated per the desires of the user.

As an option, various color coding schemes may be used in the conjunction with the present embodiment. For example, entries of a first color may indicate events from a local IP or non-routable IP (e.g. 192.168.X.X). Further, entries of a second color may be from a possibly spoofed IP address, such as the loopback adapter (127.0.0.1) or an invalid IP (0.0.0.0). Still yet, entries of a third color (i.e. red) may be from banned IP addresses.

FIGS. 6A-6F illustrate a plurality of options available to the user of the firewall, in accordance with various embodiments.

Figure 6A:
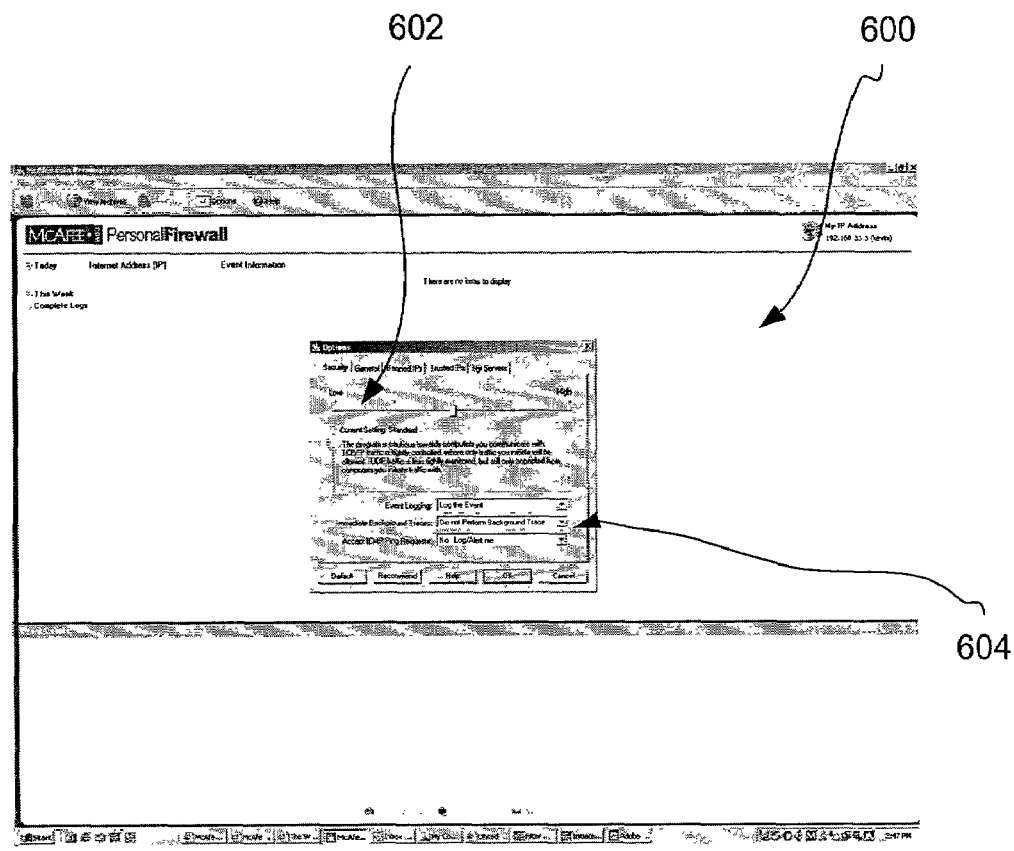
FIGS. 6A-6E illustrate a plurality of options available to the user of the firewall, in accordance with various embodiments.

FIG. 6A illustrates a security feature 600 that allows a user to utilize a slider bar 602 for setting a traffic blocking level. The traffic blocking level may be set by sliding the slider bar 602 to the desired blocking level. The blocking level ranges from completely open (Low) to completely closed (High). Table #1 elaborates on such levels.

TABLE #1

| Setting | Description |
| --- | --- |
| Open | Firewall is effectively disabled. All traffic is allowed through with no filtering. |
| Trusting | Any computer with which one initiates a connection will be trusted for IP traffic on the same port, and UDP on any port. This setting should be chosen when the user finds that some games or streaming media will not work. |
| Standard | (Recommended) Only computers with which the user initiates communications will be allowed to send traffic back. |
| Tight | Only traffic that consists of direct replies to requests from a computer will be allowed. On this setting many applications which use UDP packets (mostly games and programs that 'stream' video or audio) will not be able to get traffic. |
| Lock-Down | All traffic is stopped. This is essentially the same as unplugging an Internet connection. Even ports that have been configured to be open using the applications options will be blocked. |

As shown in FIG. 6A, various options 604 may be employed by the user. One may chose whether or not to log any events that the personal firewall reports. Immediate background traces may also be enabled to perform a trace on an event and log it in the event log for future reference. Still yet, one may choose to accept ICMP ping requests. In other words, one may set the behavior of blocking and logging for ICMP traffic. ICMP traffic is used mainly for performing traces and pings. Pinging is frequently used to perform a quick test before attempting to initiate communications. If the user is utilizing or has utilized a peer to peer file sharing program, he or she may find themselves being pinged a lot.

Table #2 illustrates the various options associated with the ICMP traffic

TABLE #2

| | |
| --- | --- |
| No-Log/Alert me | blocks the ping request and logs it as an event. |
| No-Ignore | blocks the ping request, but it does not log it. |
| Yes | allows all ping requests without logging them. |

Figure 6B:
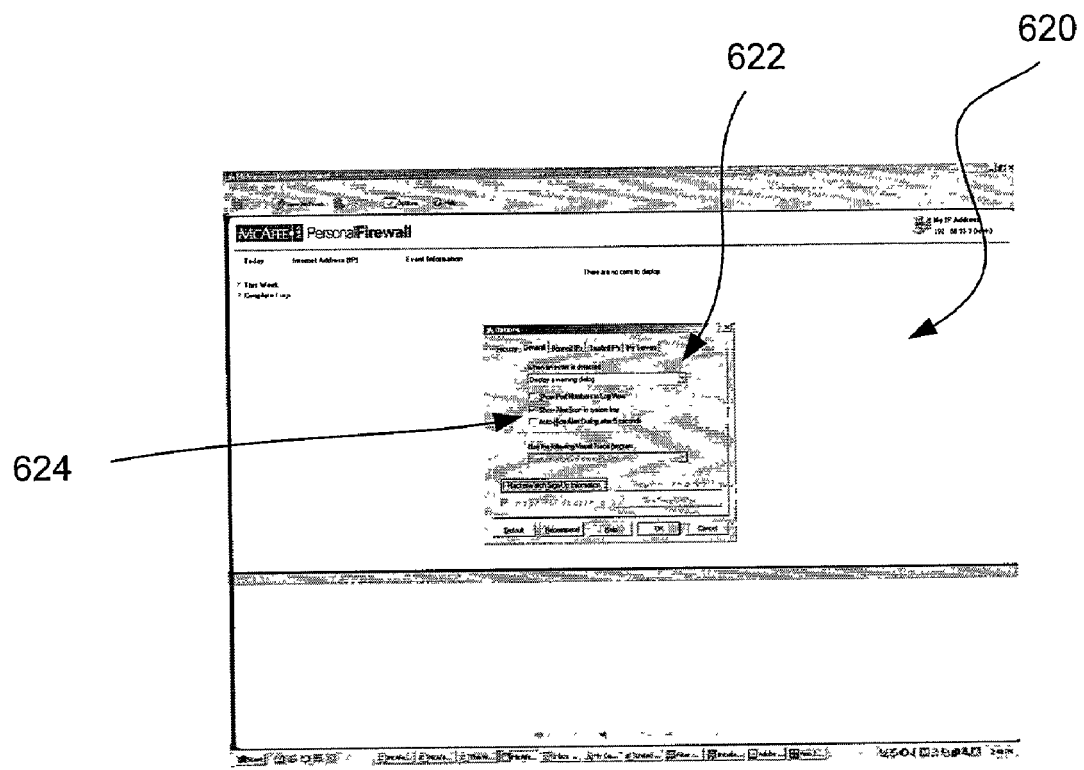

FIG. 6B illustrates various additional general options 620 that may also be provided, in accordance with one embodiment. For example, for when an event is detected, a drop-down menu 622 may let the user choose how the personal firewall notifies the user when it detects an event. Table #3 illustrates some options with respect to notifications.

TABLE #3

| | |
| --- | --- |
| Flash the Tray Icon: | Select this option to have the personal firewall flash the system tray/notification area icon. |
| Display a warning dialog: | Displays a dialog box and flashes the system tray/notification area icon when the personal firewall detects an event. |
| Keep Quiet: | The personal firewall logs events as it detects them, but it does not display any alerts. |

A user may also utilize a variety of check boxes 624 for selecting further options. For example, a user may select to show port numbers in the event log. This displays the source and destination ports of an event. Further, a user may select to show an alert icon in a system tray while the personal firewall is running. Optionally, a user may select to hide an alert dialog box five seconds after it alerts the user about an event.

Various tracing options are also available. For example, a drop down menu may be provided to allow one to select which available visual trace version to use for tracing events.

By default, the built-in tracing feature may be selected. As an option, sound effects may be used during the trace. Further, trace caches may be selectively cleared.

Still yet provided in the interface of FIG. 6B is an option to sign up for a hacker-watch service. In order to report events to a hacker-watch service (i.e. HackerWatch.org), one may sign up for the service. Signing up allows submissions to be tracked and allows the service to provide a notification if a hacker-watch server needs more information or further action from the user. The sign up process may also be important to confirm any information received. All email addresses provided to the service may be kept confidential. If a request for additional information is made by an ISP, that request is routed through the hacker-watch service without the user email address being exposed.

Figure 6C:
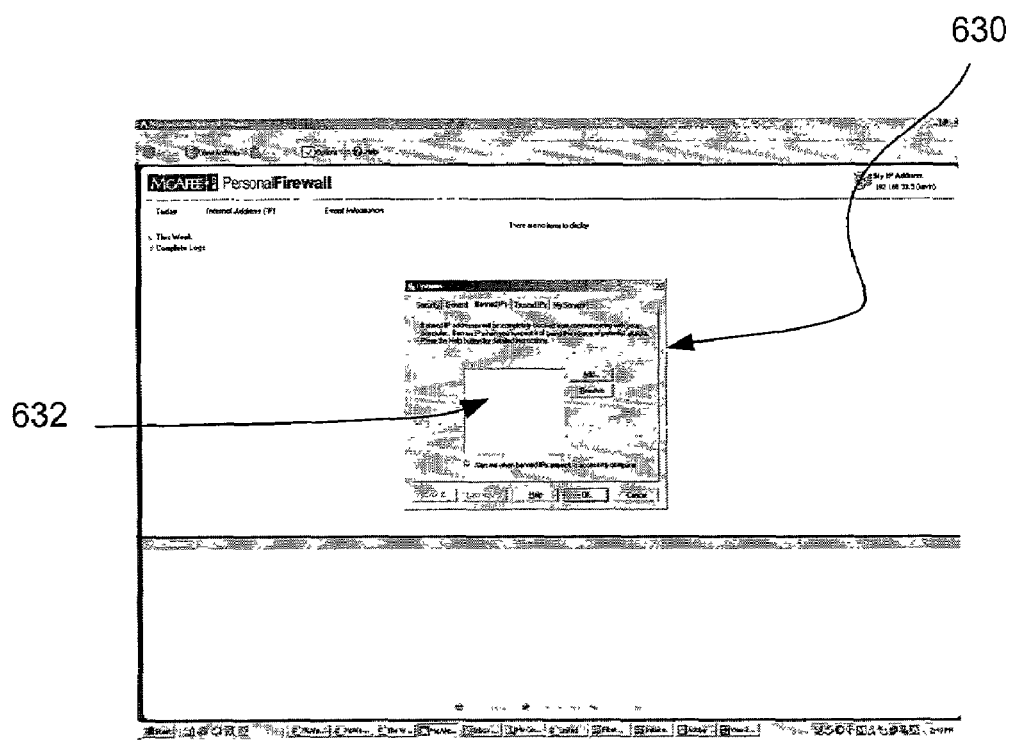

FIG. 6C illustrates an option interface 630 associated with designating banned IP addresses, in accordance with one embodiment. As shown, a banned IP address list 632 provides one with a convenient mechanism to completely block traffic from a specific computer. Effectively, the user will be invisible to a computer at that IP address regardless of other settings, and the IP address is banned. In use, if a personal firewall detects an event from a banned IP address, it will alert the user via whichever method is selected in the "When an event is detected drop-down" menu set forth earlier.

Figure 6D:
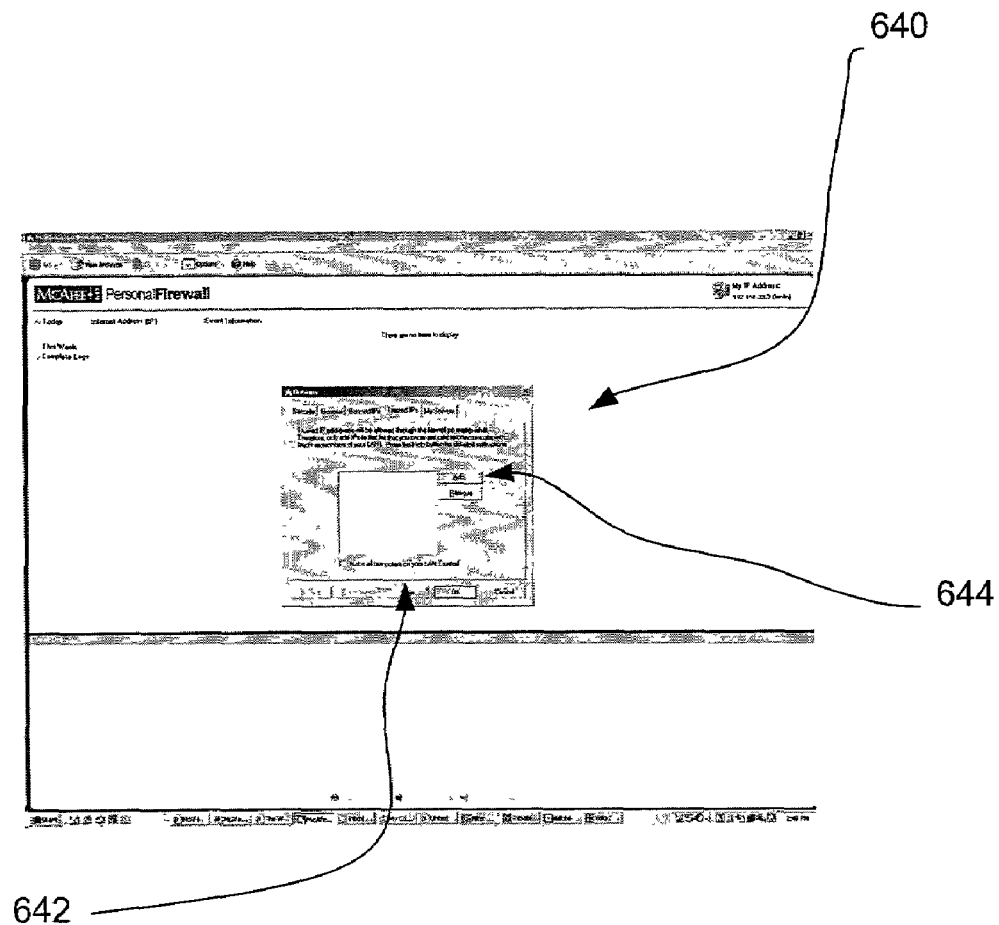

FIG. 6D illustrates an option interface 640 associated with designating trusted IP addresses, in accordance with one embodiment. The present option 640 allows a user to enter the IP addresses that they want the personal firewall to trust at all times. If a user is using a computer on an office LAN, and has no reason to block traffic from other computers on that LAN, he or she can instruct the personal firewall to trust all computers on the LAN. This can be accomplished by selecting the check box 624 indicating that all computers on a LAN are trusted. If a LAN is not detected, this option may not be available. Similar to the interface of FIG. 6C, the present interface has Add and Remove icons 644 for facilitating the foregoing process.

In use, the personal firewall trusts any IP addresses in the present list, and always allows traffic from those IPs through the firewall on any port. The personal firewall does not necessarily log any events from trusted IP addresses. To computers at a trusted IP, it may be as though no firewall is present.

Figure 6E:
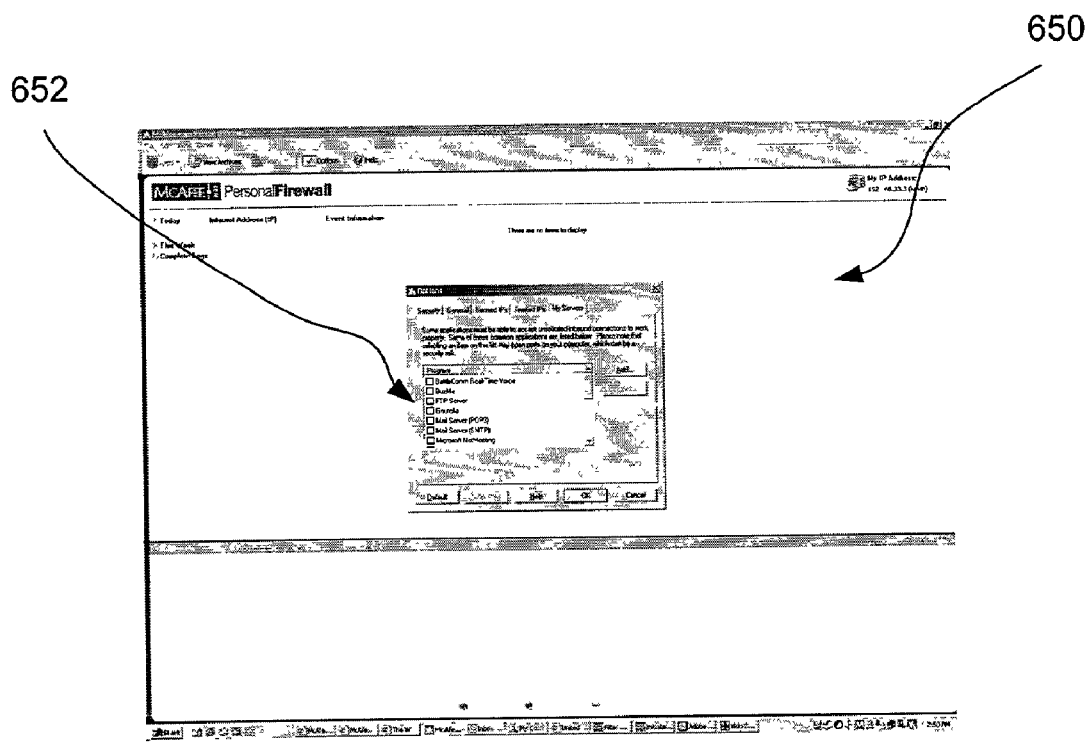

FIG. 6E illustrates an interface 650 associated with designating trusted applications, in accordance with one embodiment. Some applications need to accept unsolicited connections from other computers to work. In general, these are server programs, such as a web site host or file sharing. For example, a computer does not need to open any ports in order to receive email, but if the computer protected by the personal firewall acts as an email server, then the user may need to open the appropriate ports by checking the appropriate application items. See check boxes 652.

A user is recommended not to set applications until he or she is certain the ports must be open. A number of common applications and servers that one might be running may be pre-configured for convenience purposes. If one needs to add ports that are not already configured, he or she can add them easily through the options dialog or by simply clicking an event in the event log and creating a rule based on that event.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for summarizing firewall activity, comprising:
   (a) organizing a plurality of types of events associated with a firewall of a local computer into a plurality of categories;
   (b) tracking a number of occurrences of each type of event utilizing the firewall; and
   (c) displaying a graphical representation indicating a severity of the number of the events utilizing the firewall, wherein the graphical representation includes a graph;
   wherein a selector is displayed for setting a blocking level of the firewall to a desired blocking level;
   wherein a plurality of interface features are displayed including a summary interface, an Internet protocol (IP) address interface, an event log, and a notification option interface, wherein:
      upon the selection of the summary interface, displaying a recent activity list including total blocked access attempts by remote computers,
      upon the selection of the IP address interface, displaying the IP address interface for selecting the IP addresses associated with the remote computers to be blocked,
      upon the selection of the event log, displaying a log of the blocked access attempts by the remote computers, and
      upon the selection of the notification option interface, displaying a plurality of notification options for selection;
   wherein a lock-down option is provided for selectively blocking all access attempts via an interface;
   wherein a user is capable of performing a visual trace;
   wherein the user is capable of selectively blocking Internet control message protocol (ICMP) traffic;
   wherein the user is capable of selecting the IP addresses associated with the remote computers to be allowed access;
   wherein the user is capable of selecting a list of application programs to be allowed to communicate over a network.

2. The method as recited in claim 1, wherein the events include blocked attempts of various types.

3. The method as recited in claim 2, wherein at least one of the types of the blocked attempts includes blocked attempts of the remote computers to access predetermined banned ports associated with the local computer.

4. The method as recited in claim 2, wherein at least one of the types of the blocked attempts includes blocked attempts of the remote computers with a predetermined set of IP addresses to access the local computer.

5. The method as recited in claim 2, wherein at least one of the types of the blocked attempts includes blocked attempts to access the network made by predetermined applications.

6. The method as recited in claim 1, wherein the displayed number of occurrences of each type of event occurred a predetermined time period.

7. The method as recited in claim 1, and further comprising displaying additional information relating to the events upon selection thereof.

8. The method as recited in claim 2, wherein a first type of the blocked attempts includes blocked attempts of the remote computers to access predetermined banned ports associated with the local computer, a second type of the blocked attempts includes blocked attempts of the remote computers with a predetermined set of IP addresses to access the local computer, and a third type of the blocked attempts includes blocked attempts to access the network made by predetermined applications.

9. The method as recited in claim 8, wherein the first type of the blocked attempts, the second type of the blocked attempts, and the third type of the blocked attempts are organized into the categories.

10. The method as recited in claim 8, wherein a plurality of banned ports associated with the first type of the blocked attempts are displayed with the number of the occurrences associated therewith.

11. The method as recited in claim 8, wherein a plurality of banned IP addresses associated with the second type of the blocked attempts are displayed with the number of the occurrences associated therewith.

12. The method as recited in claim 8, wherein a plurality of banned applications associated with the third type of the blocked attempts are displayed with the number of the occurrences associated therewith.

13. A computer program product embodied on a computer readable medium for summarizing firewall activity, comprising:
   (a) computer code for organizing a plurality of types of events associated with a firewall of a local computer into a plurality of categories;
   (b) computer code for tracking a number of occurrences of each type of event utilizing the firewall, and
   (c) computer code for displaying a graphical representation indicating a severity of the number of the events utilizing the firewall, wherein the graphical representation includes a graph;
   wherein a selector is displayed for setting a blocking level of the firewall to a desired blocking level;
   wherein a plurality of interface features are displayed including a summary interface, an Internet protocol (IP) address interface, an event log, and a notification option interface, wherein:
      upon the selection of the summary interface, displaying a recent activity list including total blocked access attempts by remote computers,
      upon the selection of the IP address interface, displaying the IP address interface for selecting the IP addresses associated with the remote computers to be blocked,
      upon the selection of the event log, displaying a log of the blocked access attempts by the remote computers, and
      upon the selection of the notification option interface, displaying a plurality of notification options for selection;
   wherein a lock-down option is provided for selectively blocking all access attempts via an interface;
   wherein a user is capable of performing a visual trace;
   wherein the user is capable of selectively blocking Internet control message protocol (ICMP) traffic;
   wherein the user is capable of selecting the IP addresses associated with the remote computers to be allowed access;
   wherein the user is capable of selecting a list of application programs to be allowed to communicate over a network.

14. A system including a tangible computer readable medium for summarizing firewall activity, comprising:
   (a) logic for organizing a plurality of types of events associated with a firewall of a local computer into a plurality of categories;
   (b) logic for tracking a number of occurrences of each type of event utilizing the firewall; and
   (c) logic for displaying a graphical representation indicating a severity of the number of the events utilizing the firewall, wherein the graphical representation includes a graph,
   wherein a selector is displayed for setting a blocking level of the firewall to a desired blocking level;
   wherein a plurality of interface features are displayed including a summary interface, an Internet protocol (IP) address interface, an event log, and a notification option interface, wherein:
      upon the selection of the summary interface, displaying a recent activity list including total blocked access attempts by remote computers,
      upon the selection of the IP address interface, displaying the IP address interface for selecting the IP addresses associated with the remote computers to be blocked,
      upon the selection of the event log, displaying a log of the blocked access attempts by the remote computers, and
      upon the selection of the notification option interface, displaying a plurality of notification options for selection;
   wherein a lock-down option is provided for selectively blocking all access attempts via an interface;
   wherein a user is capable of performing a visual trace;
   wherein the user is capable of selectively blocking Internet control message protocol (ICMP) traffic;
   wherein the user is capable of selecting the IP addresses associated with the remote computers to be allowed access;
   wherein the user is capable of selecting a list of application programs to be allowed to communicate over a network.

15. A system for summarizing firewall activity, comprising:
   (a) means for organizing a plurality of types of events associated with a firewall of a local computer into a plurality of categories;
   (b) means for tracking a number of occurrences of each type of event utilizing the firewall; and
   (c) means for displaying a graphical representation indicating a severity of the number of the events utilizing the firewall, wherein the graphical representation includes a graph,
   wherein a selector is displayed for setting a blocking level of the firewall to a desired blocking level;
   wherein a plurality of interface features are displayed including a summary interface, an Internet protocol (IP) address interface, an event log, and a notification option interface, wherein:
      upon the selection of the summary interface, displaying a recent activity list including total blocked access attempts by remote computers,
      upon the selection of the IP address interface, displaying the IP address interface for selecting the IP addresses associated with the remote computers to be blocked,
      upon the selection of the event log, displaying a log of the blocked access attempts by the remote computers, and upon the selection of the notification option interface, displaying a plurality of notification options for selection, wherein a lock-down option is provided for selectively blocking all access attempts via an interface;

wherein a user is capable of performing a visual trace;

wherein the user is capable of selectively blocking Internet control message protocol (ICMP) traffic;

wherein the user is capable of selecting the IP addresses associated with the remote computers to be allowed access;

wherein the user is capable of selecting a list of application programs to be allowed to communicate over a network.

16. A firewall method, comprising:
(a) executing a firewall in association with a local computer;
(b) identifying a number of blocked attempts of remote computers with a predetermined set of Internet Protocol (IP) addresses to access the local computer;
(c) identifying a number of attempts of the remote computers to access predetermined frequently-used ports associated with the local computer;
(d) identifying a number of blocked attempts to access a network made by predetermined applications on the local computer;
(e) displaying a menu for selecting from a plurality of interface features including a summary page, an application page, an event log, and an IP address page;
(f) upon the selection of the summary page on the menu,
   (i) displaying a recent activity list including recent activity icons corresponding to events including total blocked attempts, the attempts of the remote computers to access the predetermined frequently-used ports associated with the local computer, the blocked attempts of the remote computers with the predetermined set of IP addresses to access the local computer, the recent activity list further including a total number of the events within a predetermined time period corresponding with each recent activity icon, and a graphical representation indicating a severity of the total number of the events,
   (ii) displaying a frequently accessed port list including port icons corresponding to the predetermined frequently-used ports, the frequently accessed port list further including a total number of the attempts corresponding with each predetermined frequently-used ports, and a graphical representation indicating a severity of the total number of the attempts,
   (iii) displaying a commonly blocked IP address list including IP address icons corresponding to banned IP addresses from which the blocked attempts of the remote computers occurred, the commonly blocked IP address list further including a total number of the blocked attempts corresponding with each IP address icon, and a graphical representation indicating a severity of the total number of the blocked attempts,
   (iv) displaying a commonly blocked application list including application icons corresponding to banned applications associated with the blocked attempts, the commonly blocked application list further including a total number of the blocked attempts corresponding with each application icon, and a graphical representation indicating a severity of the total number of the blocked attempts;
(g) upon the selection of the applications page on the menu, displaying an applications interface for selecting the predetermined applications;
(h) upon the selection of the untrusted IP address page on the menu, displaying an untrusted IP address interface for selecting the IP addresses associated with remote computers to be blocked; and
(i) upon the selection of the event log on the menu, displaying a log of the attempts;

wherein a slider bar is displayed for setting a blocking level of the firewall by sliding the slider bar to a desired blocking level;

wherein a lock-down option is provided for selectively blocking all access attempts via an interface;

wherein a user is capable of performing a visual trace;

wherein the user is capable of selectively blocking Internet control message protocol (ICMP) traffic;

wherein the user is capable of selecting the IP addresses associated with the remote computers to be allowed access;

wherein the user is capable of selecting a list of application programs to be allowed to communicate over the network.

* * * * *

UNITED STATES PATENT AND TRADEMARK OFFICE
CERTIFICATE OF CORRECTION

| | | |
|---|---|---|
| PATENT NO. | : 7,237,258 B1 | Page 1 of 1 |
| APPLICATION NO. | : 10/071586 | |
| DATED | : June 26, 2007 | |
| INVENTOR(S) | : Pantuso et al. | |

It is certified that error appears in the above-identified patent and that said Letters Patent is hereby corrected as shown below:

col. 10, line 61, insert --within-- before "a" and after "occurred";
col. 11, line 31, change "firewall," to --firewall;--;
col. 12, line 9, change "graph," to --graph;--;
col. 12, line 50, change "graph," to --graph;--;
col. 13, line 3, change "selection," to --selection;--;
col. 13, line 29, change "application" to --applications--.

Signed and Sealed this

Twenty-seventh Day of May, 2008

JON W. DUDAS
*Director of the United States Patent and Trademark Office*